United States Patent Office 3,196,163
Patented July 20, 1965

3,196,163
HYDRAZOSULPHOLANES AND THEIR
PREPARATION
Christopher Stanley Argyle and Ronald Arthur Reed,
Loughborough, England, assignors to Whiffen & Sons
Limited, Loughborough, England, a British company
No Drawing. Filed May 17, 1962, Ser. No. 195,383
13 Claims. (Cl. 260—332.1)

The present invention relates to new compounds which are hydrazosulpholanes.

It has been found that hydrazosulpholanes as herein described are active inter alia as fungicides and reducing agents.

Accordingly the present invention is for hydrazosulpholanes of the formula:

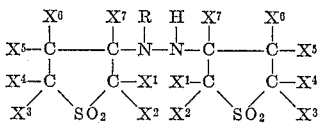

or salts or functional derivatives thereof wherein in the above formula R may comprise hydrogen or alkyl (for example methyl, ethyl or butyl) and the groups $X^1$, $X^2$, $X^3$, $X^4$, $X^5$, $X^6$ and $X^7$ may be the same or different and may comprise hydrogen, halogen (for example chlorine, bromine or iodine), hydroxy or alkyl (for example methyl, ethyl or butyl).

Suitably at least five of the groups $X^1$, $X^2$, $X^3$, $X^4$, $X^5$, $X^6$ and $X^7$ are hydrogen. Preferably the present invention is for compounds of the formula:

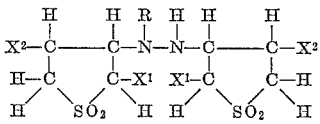

or salts or functional derivatives thereof wherein in the above formula R is hydrogen or alkyl and $X^1$ and $X^2$ may be the same or different and may be hydrogen, hydroxy or alkyl.

Specifically the present invention is for hydrazosulpholanes of the formula:

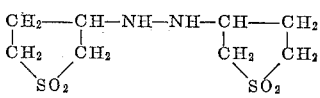

or salts or functional derivatives thereof.

Salts of the hydrazosulpholanes according to the present invention which may be mentioned include strong acid addition salts such as the hydrochloride or sulphate.

Functional derivatives which may be mentioned include acyl derivatives of the hydrazine function such as for example acetyl, propionyl, butyryl or benzoyl derivatives.

Examples of the new hydrazosulpholanes according to the present invention which may be mentioned include:

NN′-di-3-sulpholanylhydrazine,
NN′-di-(2,4-dimethyl-3-sulpholanyl)hydrazine,
NN′-di-(4-bromo-3-sulpholanyl)hydrazine,
NN′-di-(4-hydroxy-3-sulpholanyl)hydrazine,
NN′-di-(3-methyl-3-sulpholanyl)hydrazine.

According to one embodiment of the present invention there is provided a process for preparing hydrazosulpholanes as identified above which comprises reacting a hydrazine compound of the formula:

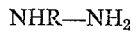
NHR—NH$_2$ with a molar excess of unsaturated cyclic sulphone of the formula:

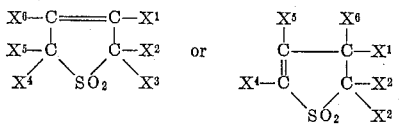

with or without a small quantity of a strong base such as for example an alkali metal hydroxide wherein $X^1$, $X^2$, $X^3$, $X^4$, $X^5$ and $X^6$ have the significance indicated above.

The temperature at which the above process is carried out depends on the reactants involved. In general, if the time of reaction is to be minimised, temperatures above 50° C. but below the decomposition temperature of the sulphone are employed.

The cyclic sulphones and particularly alpha-sulpholene and beta-sulpholene are capable of isomerization under certain conditions. Thus for example beta-sulpholene isomerizes to alpha-sulpholene in the presence of a strong base, for example hydrazine, potassium hydroxide, sodium hydroxide and the like.

Furthermore it is believed that beta-sulpholene is less reactive than alpha-sulpholene and that reactions with beta-sulpholene may involve isomerization to alpha-sulpholene.

Thus alpha-sulpholene will react with hydrazine or substituted hydrazines in the absence of a strong base whereas beta-sulpholene reacts with hydrazines which are strong bases in the presence or absence of additional strong bases or with hydrazines which are not strong bases in the presence of a strong base.

In carrying out the above process an excess of the sulphone compound is preferably employed. The excess of the sulphone compound can be removed on completion of the reaction by distillation or by water washing or by any other suitable means.

The product of the above process is preferably recovered as the hydrochloride or a similar salt.

A further embodiment of the present invention is for a method of preparing hydrazosulpholanes of the type hereinbefore described which comprises reacting together an excess of the corresponding 3-halogenosulpholane with a hydrazine of the formula:

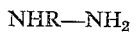
NHR—NH$_2$ wherein R has the significance indicated above.

A still further embodiment of the present invention is for a method of preparing hydrazosulpholanes of the type hereinbefore described which comprises reacting together the corresponding 3-sulpholanylhydrazine with a 2-sulpholene. Preferably the 3-sulpholanylhydrazine and the 2-sulpholene are reacted together in equimolecular amounts.

The compounds of the present invention exhibit fungicidal activity of a high order. In comparison with 3-sulpholanylhydrazine which against *A. solani* shows no activity in in vivo experiments, hydrazosulpholane in contrast shows a protectant activity of 60% or more at 2,000 p.p.m. In addition to its fungicidal activity hydrazosulpholane also shows valuable properties as a reducing agent and may be used for reducing for example metal salts in solution to colloidal metal suspensions or as antioxidants for avoiding undesired polymerisation in synthetic materials or lacquers. Furthermore hydrazosulpholane is insoluble in cold water but soluble in hot water and this property can be used to control reducing activity.

The following examples illustrate the process of the present invention.

Example 1

A solution of 64% hydrazine (1 mole) was added, with stirring, to a solution of alpha-sulpholene (2 moles) in water (10 moles). The solution was refluxed with stirring for three hours and then cooled. The hydrazosulpholane crystallized from the solution was filtered off, and dried at 60° C. Yield 90% of theory.

Example 2

Powdered potassium hydroxide (0.2 mole) was dissolved in a solution of 64% hydrazine (1 mole) in water (1 mole). This solution was then added to beta-sulpholene (3 moles). After the exothermic reaction had ceased the solution was heated at 65° C., with stirring, for 48 hours; after which it was cooled to room temperature. The hydrazosulpholane crystallized from the solution was collected, washed with cold water, and dried. The yield of hydrazosulpholane was 50% of theory based on hydrazine used, and 34% of theory based on beta-sulpholene used.

Example 3

Beta-sulpholene (1 mole) and potassium hydroxide (0.3 mole) were dissolved in water (excess) at room temperature, and the volume of solution made up to 1 litre. The solution was kept at room temperature for 24 hours and then neutralized with concentrated hydrochloric acid; the volume was reduced to half by distillation under vacuum. The solution was then refluxed with 3-sulpholanylhydrazine (0.5 mole) for 3 hours, after which it was cooled to room temperature. The hydrazosulpholane crystallized from solution, was filtered off and dried. Yield of hydrazosulpholane was 0.25 mole.

The filtrate was continuously extracted with chloroform for three hours, the chloroform distilled off, and the residue collected. The residue consisted of unchanged beta-sulpholene (0.3 mole).

Example 4

A solution of 3-hydrazinosulpholane (62 parts) and alpha-sulpholene (24 parts) in water (30 parts) was boiled for three hours. On cooling NN'-di-3-sulpholanylhydrazine (47 parts) crystallized. Recrystallized from acetic acid the product had a melting point 187–188° C.

Found: C, 35.7%; H, 6.6%; N, 10.45%; S, 23.8%. $C_8H_{16}O_4N_2S$ requires: C, 35.8%; H, 6.0%; N, 10.45%; S, 23.9%.

Example 5

A solution of 3,4-epoxysulpholane (90 parts) and 3-hydrazino-4-hydroxysulpholane (116 parts) in ethyl alcohol (1,200 parts) was stirred and heated under reflux for 24 hours. A crystalline solid (21 parts) slowly separated from the hot solution; this solid was collected and recrystallized from aqueous ethanol to afford N,N'-di-4-hydroxy-3-sulpholanylhydrazine as a colourless crystalline solid of melting point 232–233° C.

Found: C, 31.9%; H, 5.6%; N, 9.3%; S, 21.6%. $C_8H_{16}N_2O_6S_2$ requires: C, 32.0%; H, 5.35%; N, 9.35%; S, 21.35%.

We claim:

1. Hydrazosulpholane of the formula

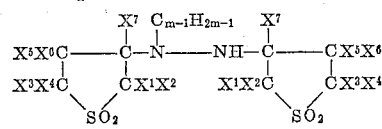
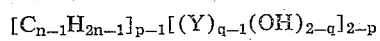

wherein
each of $X^1, X^2, X^3, X^4, X^5, X^6$ and $X^7$ is $[C_{n-1}H_{2n-1}]_{p-1}[(Y)_{q-1}(OH)_{2-q}]_{2-p}$ at least five of $X^1$ to $X^7$, in both sulpholane moieties, being hydrogen,
each of $m$ and $n$ is a positive whole number of at most 5; and
each of $p$ and $q$ is a positive whole number of at most 2; and $Y$ is a member selected from the group consisting of bromo, chloro, and iodo.

2. Hydrazosulpholane of the formula

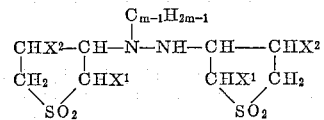

wherein
each of $X^1$ and $X^2$ is $(C_{n-1}H_{2n-1})_{p-1}(OH)_{2-p}$
each of $m$ and $n$ is a positive whole number of at most 5; and
$p$ is a positive whole number of at most 2.

3. N,N'-di-3-sulpholanylhydrazine.

4. A process for preparing hydrazosulpholane of the formula:

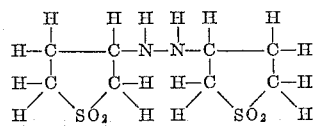

which comprises mixing 3-sulpholanylhydrazine of the formula:

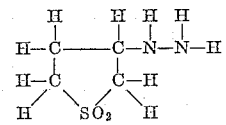

with an equimolecular proportion of alpha-sulpholene of the formula:

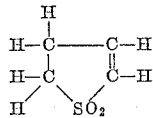

and heating the thus-formed mixture to the boiling point of the mixture.

5. A process for preparing hydrazosulpholane of the formula

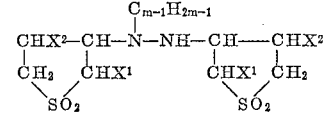
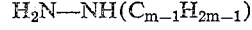

which comprises reacting a hydrazine compound of the formula $H_2N$—$NH(C_{m-1}H_{2m-1})$ with a molecular excess of an unsaturated cyclic sulphone of the formula

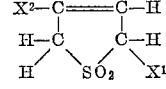

in the presence of a base at a temperature above 50° C. wherein, in each of the above formulae,
each of $X^1$ and $X^2$ is $(C_{n-1}H_{2n-1})_{p-1}(OH)_{2-p}$
each of $m$ and $n$ is a positive whole number of at most 5; and
$p$ is a positive whole number of at most 2.

6. A process for preparing hydrazosulpholane of the formula

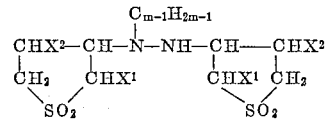

which comprises reacting a hydrazine compound of the formula $H_2N$—$NH(C_{m-1}H_{2m-1})$ with a molecular excess of an unsaturated cyclic sulphone of the formula

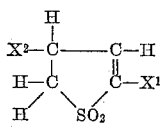

at a temperature above 50° C. wherein, in each of the above formulae, each of $X^1$ and $X^2$ is $(C_{n-1}H_{2n-1})_{p-1}(OH)_{2-p}$
each of $m$ and $n$ is a positive whole number of at most 5; and
$p$ is a positive whole number of at most 2.

7. A process for preparing hydrazosulpholane of the formula

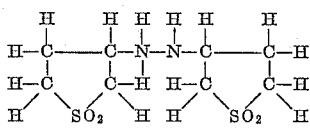

which comprises reacting hydrazine with a molecular excess of unsaturated cyclic sulphone of the formula

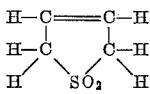

in the presence of a base at a temperature above 50° C.

8. A process for preparing hydrazosulpholane of the formula

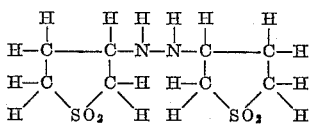

which comprises reacting hydrazine with a molecular excess of unsaturated cyclic sulphone of the formula

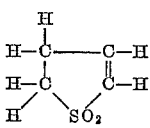

at a temperature above 50° C.

9. A process for preparing a hydrazosulpholane of the formula

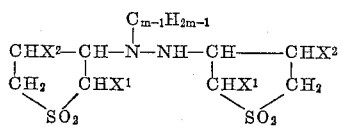

which comprises mixing a 3-sulpholanylhydrazine of the formula

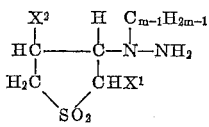

with an equimolecular proportion of α-sulpholene of the formula

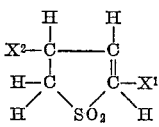

and heating the thus-formed mixture to the boiling point of the mixture, wherein, in each of the above formulae, each of $X^1$ and $X^2$ is $(C_{n-1}H_{2n-1})_{p-1}(OH)_{2-p}$;
each of $m$ and $n$ is a positive whole number of at most 5; and
$p$ is a positive whole number of at most 2.

10. N,N'-di-(2,4-dimethyl-3-sulpholanyl)hydrazine.
11. N,N'-di-(4-bromo-3-sulpholanyl)hydrazine.
12. N,N'-di-(4-hydroxy-3-sulpholanyl)hydrazine.
13. N,N'-di-(3-methyl-3-sulpholanyl)hydrazine.

References Cited by the Examiner
UNITED STATES PATENTS
3,041,352   6/62   Newey _____ 260—332.1

OTHER REFERENCES
Loev: Jour. Organic Chem., vol. 26, pages 4394–4399 (1961).
Sidgwick: Organic Chemistry of Nitrogen, page 13 (1937).

WALTER A. MODANCE, *Primary Examiner.*
DUVAL T. McCUTCHEN, *Examiner.*